Sept. 5, 1967  E. LAUBER  3,339,494
RAILROAD STATION LOADING ARRANGEMENT
Filed April 5, 1965  2 Sheets-Sheet 1
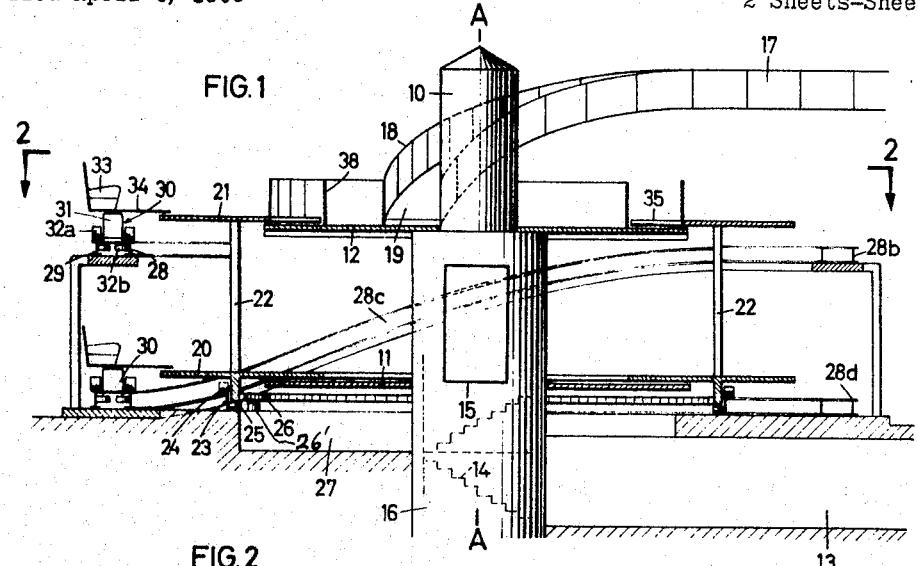
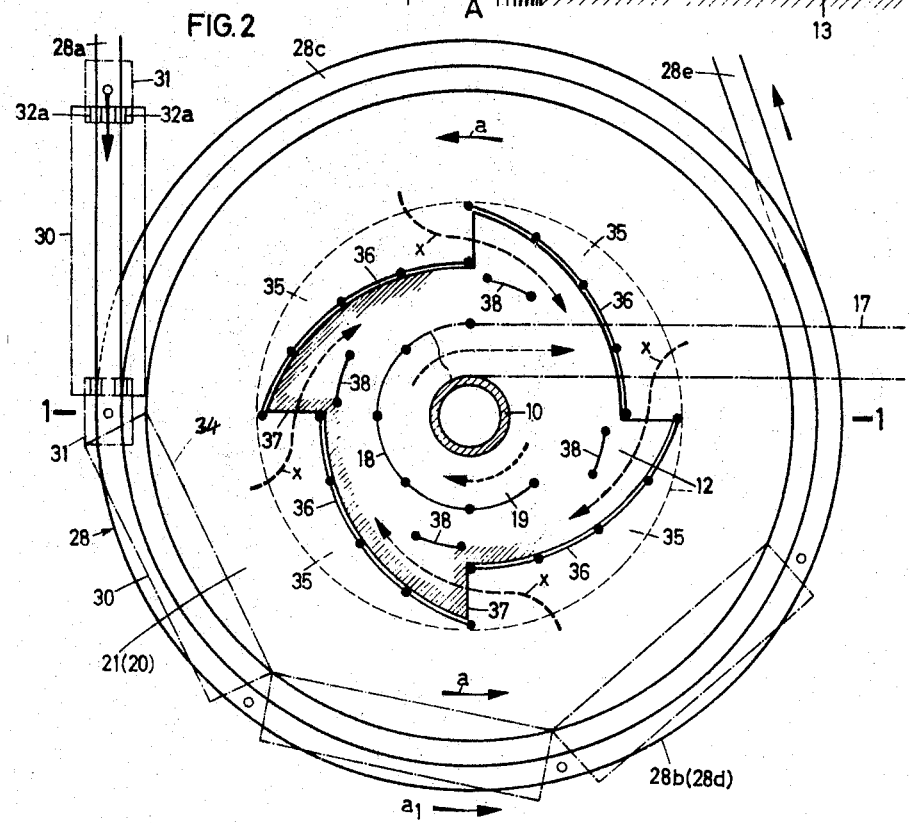
INVENTOR
Ernst Lauber
BY
Michael S. Striker
ATTORNEY Sept. 5, 1967 E. LAUBER 3,339,494
RAILROAD STATION LOADING ARRANGEMENT
Filed April 5, 1965 2 Sheets-Sheet 2

INVENTOR
Ernst Lauber
BY
Richard S. Strieter
ATTORNEY

United States Patent Office 3,339,494
Patented Sept. 5, 1967

3,339,494
RAILROAD STATION LOADING
ARRANGEMENT
Ernst Lauber, Thun, Switzerland, assignor to Firma
Maschinenfabrik Habegger, Thun, Switzerland
Filed Apr. 5, 1965, Ser. No. 445,439
Claims priority, application Germany, Oct. 20, 1964,
M 62,816
17 Claims. (Cl. 104—20)

ABSTRACT OF THE DISCLOSURE

Central stationary platforms to which underpasses and overpasses lead, are surrounded by annular rotary platforms whose peripheries are partly surrounded by continuous tracks so that a train moving along the periphery of one rotary platform at the peripheral speed of the same descends or ascends to the level of the other rotary platform and moves around part of the same at the same peripheral speed. Passengers alighting from an arriving train on one rotary platform leave over the respective stationary platform so that the train arrives empty at the other rotary platform where passengers entering over the respective stationary platform board the train which preferably has open inwardly facing cars.

The present invention relates to a railroad station loading arrangement, and more particularly to a platform construction permitting passengers to board and alight from moving trains.

Platform constructions serving this purpose are known, and comprise straight moving conveyer bands along the edge of the platform permitting passengers to board trains moving along the platform edge at substantially the same speed as the moving conveyer bands and the passengers. However, the capacity of loading arrangements of this type is limited.

It is one object of the present invention to improve the known railroad station loading arrangements, and to provide a railroad station permitting the continuous loading and unloading of great numbers of passengers without requiring the stopping of trains.

Another object of the invention is to provide a rotary railroad station loading arrangement in which the trains move around the circular periphery of a rotary platform.

Another object of the invention is to provide a rotary platform permitting the continuous loading and unloading of moving trains.

Another object of the invention is to separate the streams of passengers alighting from a train, and boarding the same train.

Another object of the invention is to provide a railroad station loading arrangement which is particularly suitable for fairs and exhibitions requiring the continuous transportation of great numbers of passengers.

With these objects in view, the present invention relates to a railroad station construction which permits the loading and unloading of moving trains. One embodiment of the invention comprises a rotary platform having a circular periphery; a curved track extending about a part of the periphery of the rotary platform, other track portions leading toward and away from the curved track; and trains moving along the track at a speed substantially equal to the peripheral speed of the rotary platform. Since there is no speed difference between the peripheral speed of the rotary platform and the train, passengers can alight from the train onto the rotating platform, and board the train from the same without stopping of the train.

Since the circumferential speed of the rotating platform increases from the center to the periphery, a stationary platform is provided at the center of the rotary platform, and passenger crossings in the form of overpasses or underpasses extend across the rotary platform to the stationary platform. Since the speed of the rotary platform adjacent the stationary platform is smaller than at the outer periphery of the rotary platform, the passengers can walk from the stationary platform onto the moving rotary platform without difficulties, and are gradually accelerated to the higher rotary speed while walking across the rotary platform to the peripheral edge of the same where they enter the train. The same conditions prevail for passengers leaving trains and walking from the faster moving outer periphery of the rotary platform toward the stationary platform at the center of the rotary platform.

It is preferred to provide either the rotary platform or the stationary platform with spiral-shaped projections overlapping the respective other platform, and to provide railings for guiding the passengers along the curved edges of the projecting platform portions. In this manner, the passengers have to cross over radially extending lines from the stationary platform to the rotary platform, or from the rotary platform to the stationary platform. The railings along the spiral-shaped projections guide the passengers to move along corresponding spiral-shaped paths so that the passengers are uniformly distributed around the circumference of the rotary platform, and furthermore the arrangement is such that the passengers are compelled to move from the stationary platform to the rotary platform, or from the rotary platform to the stationary platform in streams which are tangential to the relative rotary movement so that disturbances and accidents are prevented.

It is also advantageous to guide the streams of passengers in such a manner that the portion of the rotary platform from which passengers move to the stationary platform, moves away from the stationary platform. Similarly, portions of the rotary platform which are entered by passengers from the stationary platform, also move away from the corresponding adjacent portion of the stationary platform.

In the preferred embodiment of the invention, two rotary platforms are provided and partly surrounded by curved tracks. One of the platforms is used for passengers alighting from trains, and the other platform is used for passengers boarding trains.

In the preferred embodiment of the invention, the two rotary platforms are arranged at two horizontal levels and connected for rotation, while the trains move along a spiral-shaped track first about part of the periphery of the upper rotary platform, then in a helical track portion down to the level of the lower rotary platform, and then around the periphery of the lower rotary platform. In this arrangement, the passengers alight at the upper platform from the moving train, and the empty train is loaded by passengers on the lower rotary platform.

A tower advantageously connects upper and lower stationary platforms at the centers of the rotary platforms, and is connected to an underpass and overpass crossing the rotary platforms, respectively and the tracks surrounding the same. The passengers leaving a train move over the upper rotary platform onto the upper stationary platform, and enter a part-circular end portion of the overpass which is continued in tangential direction to cross the upper rotary platform and the corresponding track. Passengers enter through the underpass and its circular inner end and move in a spiral-shaped stream onto the stationary platform from where they step onto the inner portion of the rotary platform, walk across the same, and board the train along the curved track surrounding a part of the periphery of the lower rotary platform.

The railroad station construction of the present invention is particularly suitable for automatic railroads in which the trains follow each other directly under automatic control. Known electronic control means are advantageously provided which permit successive trains to directly follow each other while moving around the rotary platforms, while the trains are automatically separated, and move at predetermined distances from each other on the free tracks connecting several railroad stations so that a greater speed is permissible between stations, while maximum loading and unloading capacity is assured at the station. When trains follow each other directly around the rotary platform, continuous unloading and loading can take place.

The rotary platform may be divided into a plurality of annular rotary platform parts which rotate at different speeds, the outer platform parts rotating at a higher speed than the inner platform parts which surround the centrally located stationary platform.

A particular advantage of the rotary platform of the present invention is that passengers failing to enter a train continue to move around with the rotary platform, while in a known platform construction with a straight conveyer band, a passenger failing to enter the train must step again on the stationary platform and return to the beginning of the conveyer band.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an elevation, partially in section, and illustrating an embodiment of the invention;

FIG. 2 is a plan view of the embodiment of FIG. 1, partially in section along line 2—2 in FIG. 1;

Figure 3:
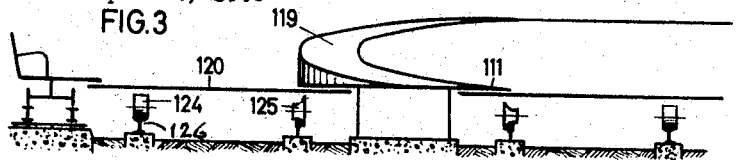
FIG. 3 is a fragmentary schematic vertical section illustrating a modified embodiment of the invention.

Referring now to the drawings, and more particularly to FIGS. 1 and 2, a tower structure 18 supports a lower annular stationary platform 11, and an upper annular stationary platform 12. Passengers enter the tower through an underpass 13 and walk on stairs in the tower to the level of the lower stationary platform 11. Passengers leaving the station walk from the upper stationary platform onto a circular or helical portion 19 of an overpass 17 which is bounded by a railing 18. The stairs 14 may also lead to the upper stationary platform 12, but in the illustrated embodiment, the passengers walk from the interior of the tower through a door 15 onto the lower stationary platform 11. The stairs 14 may be replaced by a spiral-shaped helical stair or ramp on the outside of tower 16.

Circular annular rotary platforms 20 and 21 are mounted, respectively, directly above the stationary platforms 11 and 12, and have spiral-shaped projections 35 overlapping the respective stationary platform. Projections 35 are bounded by spiral-shaped railings 36, and by radial lines 37 over which the passengers move from the rotary platform 21 to the stationary platform 12, and from the stationary platform 11 to the rotary platform 20.

Rotary platforms 20 and 21 are connected by vertical posts 22 for rotation about a common vertical axis A—A. The rotary platform structure has rollers 24 and other rollers 25 mounted for rolling movement on a circular rail 23 which defines the axis of rotation of the structure. An inner gear 26 is secured to the platform structure below platform 20, and meshes with a drive pinion 26' driven by a motor, not shown, mounted in a basement chamber 27. A track 28 has a tangential portion 28a at the level of the upper rotary platform 21. A curved track portion 28b is parallel and adjacent to the circular periphery of the rotary platform 21 and extends over an arc of 180° to 270°. A helical track portion 28c has the same radius of curvature as the track portion 28b, but descends to the lower level of rotary platform 20. The following track portion 28d is parallel and adjacent to the circular periphery of the rotary platform 20 extending over an angle between 180° and 270°, and terminating in a substantially tangential track portion 28e.

The track 28 is formed, for example, by two parallel rails 29 which are I-profiles. A train including a plurality of railroad cars 30 moves along track 28 at the same speed as the peripheral speed of the rotary platforms. Each car 30 has at one end a turnable bogie 31 with wheels 32a and guide rollers 32b which engage inner lateral faces of rails 29. Cars 30 have bottom plates 34 overlapping segment-shaped portions of the rotary platforms, as best seen in FIG. 2. Seats 33 are mounted on bottom plates 34 in a single row, facing inward toward the center of the rotary platform. Consequently, all passengers can simultaneously step from their seats onto the outer peripheral portion of the rotary platform 21, and since the train moves at the same speed as the outer peripheral portion of the rotary platform, the passengers will have the sensation of stepping out of a stopped train onto a stationary platform. The same conditions prevail at the lower platform 20 where passengers step on the bottom plate 34 of each car. Due to the seat arrangement, all seats can be simultaneously approached by passengers while the car is moving. Loading and unloading of passengers can take place over an angle between 180° and 270° on each platform, and if a passenger has failed to find a seat in the cars of a train, he is carried in a circular motion by the rotary platform 20 until he again enters the region of the curved track 28d where the next following train has arrived in the meantime.

In the illustrated embodiment, four spiral-shaped projections 35 of each rotary platform project over corresponding portions of the circular stationary platform.

The rotary platforms 20 and 21 rotate in the direction of the arrows a so that passengers leaving a train in the region of track 28b move first in the direction of the arrows a while walking in radial direction toward the stationary platform and railings 36. In order to cross over lines 35 from the rotary platform 21 to the stationary platform 12, they must walk in the direction of the arrows x. The projecting portions 35 of the rotary platform move relative to the stationary platform on lines 37 in the direction of the arrows a which is opposite to the direction x of movement of the stream of passengers so that the passengers have to walk faster than the circumferential speed of portions 35 in order to step onto the stationary platform which increases the safety of the arrangement since otherwise the passengers may be delivered by the rotary platform to the stationary platform in greater numbers than can leave the stationary platform through the spiral-shaped passenger walk 19.

The rotating railings 36 guide the passengers toward lines 37 and to the inner portions of the rotary platform 21.

Passengers having entered the stationary platform 12 are guided by rails 38 to first walk in circumferential direction while they are inwardly guided by the rotating railings 36 into the region of the entrance to the passenger walk 19 which is formed between the part-circular railing 18 and the top portion 10 of tower 16. The passenger walk 19 may be a ramp or stair helically rising along the outer surface of column 10.

The lower stationary platform 11 and rotary platform 20 are constructed in the same manner as described and shown for the upper platforms. Of course, the directions of the streams of passengers are reversed, and the passengers walk out of the door of the tower onto the central portion of the stationary platform 11, and then walk inwardly of railings 38 and 36 to the lines 37 over which they cross from the stationary platform 11 to the spiral-shaped projections 35 of the rotary platform 20. In this case, the rotary platform moves away from the stationary platform in the region of the lines 37, so that the passengers leave the stationary platform faster than they enter it, preventing any congestion on the stationary platform 11 which is an additional safety factor. The movement of the passengers is in a direction opposite to the arrows x, but is then continued in the direction of the arrow a since both rotary platforms rotate in the same direction. Since the radius of the inner portions 35 of the rotary platform 20 is smaller than the radius of the periphery of platform 20, the passengers walking toward the train are accelerated to a higher peripheral speed which is equal to the speed of the train so that the passengers can easily step on bottom plates 34 of the railroad cars and sit down on seats 33 facing inwardly.

In a modified arrangement, the stationary platform 11 is located above the rotary platform 20, and has spiral-shaped projections bounded by stationary rails 36 and overlapping an inner portion of the rotary platform 20. Such an arrangement further increases the safety and smooth transition of the passengers from the stationary platform to the rotary platform. However, particularly if low speeds of the train and of the rotary platforms are acceptable, the spiral-shaped projections may be omitted, and the stationary platform may be made circular so that the passengers step over a circular line from the stationary platform to the rotary platform, or vice versa.

On the other hand, if the trains are to move through the station at very high speed, it is preferred to divide the rotary platforms into three concentric rings which move at different speeds so that the ring adjacent the stationary platform moves at a substantially lower rotary speed than a ring adjacent the track. This arrangement results in a gradual acceleration and deceleration of the passengers in circumferential direction while crossing the rotary platform.

The station construction may be further modified by providing a single underpass, or overpass for passengers entering and leaving the station so that the passengers descend within the tower 16 to the lower level, or ascend within the tower to the upper level.

Figure 4:
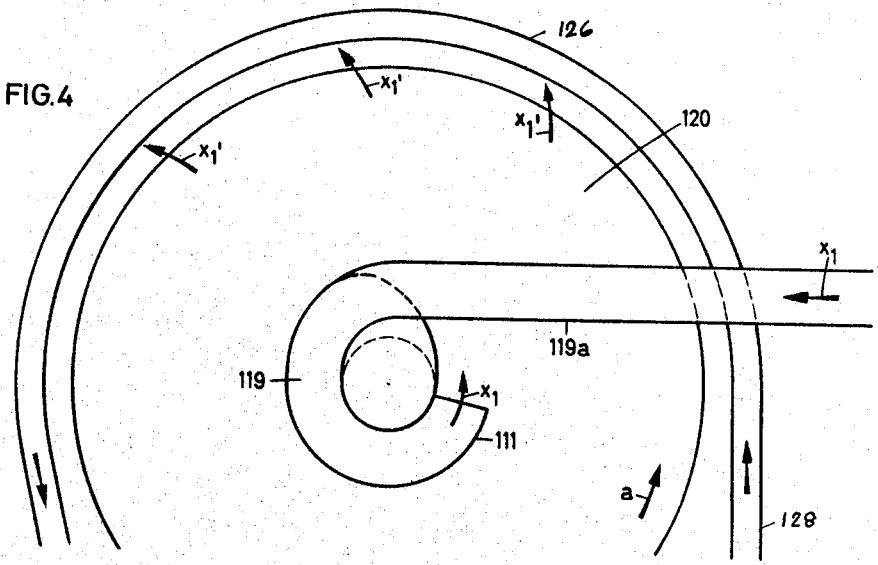
FIG. 4 is a fragmentary schematic plan view of the embodiment of FIG. 3.

It is possible to provide one rotary platform for passengers leaving a train, and to provide another rotary platform, rotatable about another vertical axis for passengers entering the train. Such a construction is shown in FIGS. 3 and 4. A circular rotary platform 120 is mounted for rotation about a vertical axis on rollers 124, 125 which roll on circular rails 126. A passenger crossing includes an overpass portion 119a, and a helical descending portion 119 terminating in a part-circular horizontal portion directly on top of the rotary platform 120 and separated by circular railings from the same.

The passengers walk first in the direction of the arrow $x_1$ along the overpass 119a without stepping on the rotary platform 120, and are then guided in a circular stream over a radial line from the stationary walk 111 onto the rotary platform 120. The stream of passengers moves onto the rotary platform 120 in circumferential or tangential direction so that the passengers can continue to walk in the same direction as before while being transported in the direction of the arrow a away from the stationary walk 111. After crossing the rotary platform, the passengers enter the train in the direction of the arrows $x_1'$. The trains move at the same speed as the periphery of the rotary platform 120 so that the passengers can board the moving train without difficulty.

A train entering the tangential track portion 128 of track 126 has already passed another station, not shown, constructed in the same manner as the station illustrated in FIGS. 3 and 4. The other station is used for unloading passengers who step out of a train while the same moves along a part-circular track at the same speed as the adjacent periphery of the rotary platform 120. A stationary passenger walk 111, 119, 119a is provided along which the passengers walk on the center portion of the rotary platform to a point located outside of the station.

Figure 5:
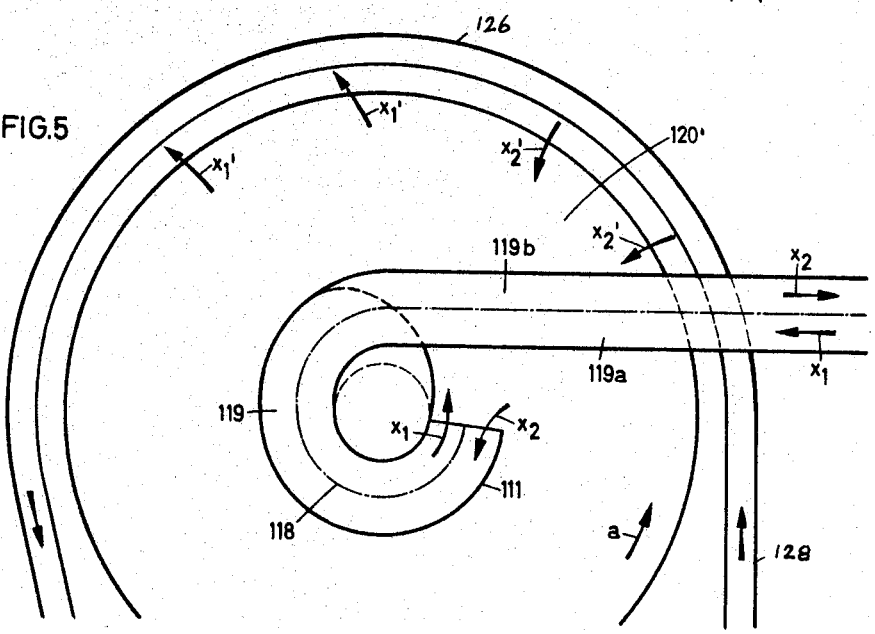
FIG. 5 is a fragmentary schematic plan view of the modified embodiment.

The modified embodiment of FIG. 5 corresponds to the embodiment of FIGS. 3 and 4, but instead of two rotary platforms, a single rotary platform 120' is provided for unloading passengers from a train, and for loading other passengers on the same train. The rotary platform 120' is partly surrounded by a circular track 126. Trains arrive in the direction of the arrow on track portion 128, and move along the track 126 at the same speed as the peripheral speed of the rotary platform 120'. During a first part of the periphery of the rotary platform, passengers alight in the direction of the arrows $x_2'$, and during a second part of the periphery of the platform, other passengers board the train in the direction of the arrows $x_1'$. A stationary passenger walk has a portion 111 directly above the rotary platform, a helical portion 119 rising to a higher level, and an overpass portion 119b. A central railing 118 divides the passenger walk into an inner part and an outer part so that the streams $x_1$ of passengers entering the station, and $x_2$ of passengers leaving the station are separated.

It is advantageous to arrange the seats of the railroad cars not only facing inward, but spaced from each other to facilitate the loading, and to provide spaces for baby carriages and suitcases. The seats may also be arranged along a concave curved line to provide space on the bottom plate of the car in front of the seats where suitcases may be placed.

Stations according to the present invention are most efficiently operated if trains are provided with electronic controls permitting trains to follow each other directly while moving along the circular track at the station, while moving at higher speeds and spaced greater distances on the open track portions between stations.

It will be understood that each of the elements described above, or two or more together, may also find a useful application in other types of railroad stations differing from the types described above.

While the invention has been illustrated and described as embodied in a railroad station including two rotary platforms surrounded by a helical railroad track, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A railroad station loading arrangement comprising, in combination, annular rotary platform means having a circular periphery; track means including a curved track extending about a part of the periphery of said rotary platform means, and track portions leading toward and away from said curved track; a stationary central platform means surrounded by said annular rotary platform means; support means having one helical end portion terminating in circumferential direction at the inner portion of said stationary platform and rising above the same to a level above said rotary platform means, said support means having the other end portion outside of said periphery of said rotary platform means and being adapted to support passengers entering or leaving said stationary platform means; and train means moving along said track means and having in the region of said curved track a speed substantially equal to the peripheral speed of said rotary platform means whereby passengers can alight from the moving train means onto said rotary platform, and walk over said stationary central platform to said support means, while passengers walking from said support means over said stationary central platform means to said annular rotary platform means board said train means from said rotary platform means without stopping of the train means.

2. A railroad station loading arrangement comprising, in combination, rotary platform means having a circular periphery; track means including a curved track extending about a part of the periphery of said rotary platform means, and track portions leading toward and away from said curved track; a stationary platform means at the center of said rotary platform means, one of said platform means having peripheral projections overlapping the other platform means and bounded by lines crossed by passengers moving from one to the other of said platform means; support means having one end at said stationary platform means and the other end outside of said periphery of said rotary platform means and being adapted to support passengers entering or leaving said stationary platform means; and train means moving along said track means and having in the region of said curved track a speed substantially equal to the peripheral speed of said rotary platform means whereby passengers can alight from the moving train means, and board the same from said rotary platform means without stopping of the train means.

3. A railroad station loading arrangement comprising, in combination, rotary platform means having a circular periphery; track means including a curved track extending about a part of the periphery of said rotary platform means, and track portions leading toward and away from said curved track; a stationary platform means at the center of said rotary platform means, one of said platform means having peripheral projections overlapping the other platform means, each projection being bounded by a spiral-shaped line and by a substantially radial line, and having a guide railing along said spiral-shaped line so that said radial line is crossed by passengers moving from one to the other of said platform means; support means having one end at said stationary platform means and the other end outside of said periphery of said rotary platform means and being adapted to support passengers entering or leaving said stationary platform means; and train means moving along said track means and having in the region of said curved track a speed substantially equal to the peripheral speed of said rotary platform means whereby passengers can alight from the moving train means, and board the same from said rotary platform means without stopping of the train means.

4. A railroad station loading arrangement as set forth in claim 3 wherein said rotary platform means has such a direction of rotation that portions of said rotary platform means adjacent said radial lines move away in circumferential direction from adjacent portions of said stationary platform means located on the other side of the respective radial lines.

5. A railroad station loading arrangement as set forth in claim 3 wherein said overlapping projections of said one platform means are located above said other platform means, and wherein said radial lines are adapted to be crossed by streams of passengers moving from projections of said one platform means to said other platform means.

6. A railroad station loading arrangement comprising, in combination, rotary platform means including an upper rotary platform and a lower rotary platform having parallel circular peripheries and being mounted for rotation about a common vertical axis; continuous track means including a higher curved track and a lower curved track respectively extending about parts of said peripheries of said rotary platforms, a connecting track connecting said higher and lower curved tracks, and track portions leading toward and away from said curved tracks; and train means moving along said track means and having in the region of said curved tracks speeds substantially equal to the peripheral speeds of said rotary platforms whereby passengers can alight from said train means onto one of said rotary platforms, and other passengers can board the same train means on the other rotary platform without stopping of said train means.

7. A railroad station loading arrangement comprising, in combination, rotary platform means including an upper rotary platform and a lower rotary platform having parallel circular peripheries and being mounted for rotation about a common vertical axis; continuous track means including a higher curved track and a lower curved track respectively extending about parts of said peripheries of said rotary platforms, track portions leading toward and away from said curved tracks, respectively, and a helical connecting track connecting said curved tracks and having the same radius of curvature as said peripheries of said rotary platforms; and train means moving along said track means and having in the region of said curved tracks speeds substantially equal to the peripheral speeds of said rotary platforms whereby passengers on one of said rotary platforms can alight from said train means onto one of said rotary platforms, and other passengers can board the same train means on the other rotary platform without stopping of said train means.

8. A railroad station loading arrangement comprising, in combination, rotary platform means including an upper rotary platform and a lower rotary platform having parallel circular peripheries of equal diameter and being mounted for rotation about a common vertical axis; drive means for driving said rotary platforms at the same rotary speed and in the same direction of rotation; continuous track means including a higher curved track and a lower curved track respectively extending about parts of said peripheries of said rotary platforms, a connecting track connecting said higher and lower curved tracks, and track portions leading toward an away from said curved tracks; and train means moving along said track means and having in the region of said curved tracks speeds substantially equal to the peripheral speeds of said rotary platforms whereby passengers can alight from said train means onto one of said rotary platforms, and other passengers can board the same train means on the other rotary platform without stopping of said train means.

9. A railroad station loading arrangement comprising, in combination, rotary platform means including an upper rotary platform and a lower rotary platform having parallel circular peripheries of equal diameter and being mounted for rotation about a common vertical axis; drive means for driving said rotary platforms at the same rotary speed and in the same direction of rotation; continuous track means including a higher curved track and a lower curved track respectively extending about part of said peripheries of said rotary platforms, track portions leading toward and away from said curved tracks, respectively, and a helical connecting track connecting said curved tracks and having the same radius of curvature as said peripheries of said rotary platforms; and train means moving along said track means and having in the region of said curved tracks speeds substantially equal to the peripheral speeds of said rotary platforms whereby passengers can alight from said train means onto one of said rotary platforms, and other passengers can board the same train means on the other rotary platform without stopping of said train means.

10. A railroad station loading arrangement comprising, in combination, rotary platform means including an upper rotary annular platform and a lower rotary annular platform having parallel circular peripheries and being mounted for rotation about a common vertical axis; track means including a higher curved track and a lower curved track respectively extending about parts of said peripheries of said rotary platforms, a connecting track connecting said higher and lower curved tracks, and track portions leading toward and away from said curved tracks; an annular stationary platform at the center of each of said rotary platforms; a tower having means for supporting passengers and located within said annular stationary platforms; passenger walk means having an end in said tower, another end outside of said peripheries of said rotary platforms, and parts extending across said rotary and stationary platforms so that passengers may enter and leave said stationary platforms through said tower without stepping on said rotary platforms; and train means moving along said track means and having in the region of said curved tracks speeds substantially equal to the peripheral speeds of said rotary platforms whereby passengers can alight from said train means onto one of said rotary platforms, and other passengers can board the same train means on the other rotary platform without stopping of said train means.

11. A railroad station loading arrangement comprising, in combination, rotary platform means including an upper rotary annular platform and a lower rotary annular platform having parallel circular peripheries and being mounted for rotation about a common vertical axis; track means including a higher curved track and a lower curved track respectively extending about parts of said peripheries of said rotary platforms a helical connecting track connecting said higher and lower curved tracks, and track portions leading toward and away from said curved tracks; an annular stationary platform at the center of each of said rotary platforms; a tower having means for supporting passengers and located within said annular stationary platforms; an overpass having a portion above said higher rotary platform and an underpass having a portion located below said lower rotary platform and having ends located in said tower and other ends outside of said peripheries of said rotary platforms and of said curved tracks so that passengers may enter and leave said stationary platforms through said tower without stepping on said rotary platforms; and train means moving along said track means and having in the region of said curved tracks speeds substantially equal to the peripheral speeds of said rotary platforms whereby passengers can alight from said train means onto one of said rotary platforms and leave over the respective stationary platform, and other passengers coming from the other stationary platform can board the same train means on the other rotary platform without stopping of said train means.

12. A railroad station loading arrangement comprising, in combination, rotary platform means including an upper rotary platform and a lower rotary platform having parallel circular peripheries and being mounted for rotation about a common vertical axis; track means including a higher curved track and a lower curved track respectively extending about parts of said peripheries of said rotary platforms and track portions leading toward and away from said curved tracks; an annular stationary platform at the center of each of said rotary platforms; a tower having means for supporting passengers and located within said annular stationary platforms; an overpass above said higher rotary platform and an underpass located below said lower rotary platform, and having helical inner ends located at said tower and portions crossing said rotary and stationary platforms and extending tangentially to said helical ends, said overpass and underpass having other ends outside of said peripheries of said rotary platforms and of said curved tracks so that passengers may enter and leave said stationary platforms through said tower without stepping on said rotary platforms; and train means moving along said track means and having in the region of said curved tracks speeds substantially equal to the peripheral speeds of said rotary platforms whereby passengers on one of said rotary platforms can board said train means, and passengers can alight from said train means onto the other rotary platform without stopping of said train means.

13. A railroad station loading arrangement as claimed in claim 3, said rotary platform means including a plurality of circular annular rotary platform parts having a common vertical axis of rotation and driven to rotate at different speeds, the rotary speed of each platform part being greater than the rotary speed of each platform part located inward of the same.

14. A railroad station loading arrangement as claimed in claim 3, said train means including a car having seats facing inward from the periphery of said rotary platform means whereby passengers can alight from the moving train means, and board the same from said rotary platform without stopping of the train means.

15. A railroad station loading arrangement comprising, in combination, rotary platform means having a circular periphery; track means including a curved track extending about a part of the periphery of said rotary platform means, and track portions leading toward and away from said curved track; a stationary platform means at the center of said rotary platform means; support means having one end at said stationary platform means and the other end outside of said periphery of said rotary platform means and being adapted to support passengers entering or leaving said stationary platform means; and train means moving along said track means and having in the region of said curved track a speed substantially equal to the peripheral speed of said rotary platform means, said train means including a car having seats facing inward from the periphery of said rotary platform means, said car having a bottom plate partly located outwardly of said rotary platform means for supporting said seats, and overlapping a peripheral segment portion of said rotary platform means whereby passengers can alight from the moving train means, and board the same from said rotary platform without stopping of the train means while placing baggage on the overlapping portion of the bottom plate.

16. A railroad station loading arrangement comprising, in combination, rotary platform means including an upper rotary annular platform and a lower rotary annular platform having parallel circular peripheries of equal diameter and being mounted for rotation about a common vertical axis; drive means for driving said rotary platforms at the same rotary speed and in the same direction of rotation; continuous track means including a higher curved track and a lower curved track respectively extending about parts of said peripheries of said rotary platforms, track portions leading toward and away from said curved tracks, respectively, and a helical connecting track connecting said curved tracks and having the same radius of curvature as said peripheries of said rotary platforms; an annular stationary platform at the center of each of said rotary platforms; a tower having means for supporting passengers and located within said annular stationary platforms; an overpass having a portion above said higher rotary platform and an underpass having a portion located below said lower rotary platform, and having ends located at said tower and other ends outside of said peripheries of said rotary platforms and of said curved tracks; and train means moving along said track means and having in the region of said curved tracks speeds substantially equal to the peripheral speeds of said rotary platforms whereby passengers can alight from said train means onto one of said rotary platforms, and other passengers can board the same train means on the other rotary platform without stopping of said train means.

17. A railroad station loading arrangement comprising, in combination, rotary annular platform means having a circular periphery; a stationary central circular platform surrounded by said rotary platform means; track means including a curved track extending about a part of the periphery of said rotary platform means, and track portions leading toward and away from said curved track; passenger cross walk means having an inner helical end portion located at the center of said stationary platform means and having an outer railing and a portion extending tangentially to said inner helical portion and across said rotary platform means and said curved track means so that passengers may enter and leave said stationary platform means; and train means moving along said track means and having in the region of said curved track a speed substantially equal to the peripheral speed of said rotary platform means whereby passengers can alight from the moving train means, and board the same from said rotary platform without stopping of the train means.

References Cited

UNITED STATES PATENTS

| | | | |
|---|---|---|---|
| 368,420 | 8/1887 | Pearsons | 104—21 |
| 474,657 | 5/1892 | Hollingsworth | 104—21 |
| 755,361 | 3/1904 | Condon | 104—25 |
| 780,268 | 1/1905 | Curtiss | 104—21 |
| 815,834 | 3/1906 | Hutchinson | 104—25 |
| 941,954 | 11/1909 | Ross | 104—20 |
| 1,412,969 | 4/1922 | Sachs | 104—25 |
| 1,597,959 | 8/1926 | Edwards | 104—21 |
| 1,659,608 | 2/1928 | Miller | 104—28 |
| 1,661,490 | 3/1928 | Mihaliak | 104—28 |
| 2,981,202 | 4/1961 | Turner | 104—25 |
| 3,096,725 | 7/1963 | Widmer | 104—25 |

ARTHUR L. LA POINT, *Primary Examiner.*

D. F. WORTH, *Assistant Examiner.*